United States Patent [19]

Magee

[11] 3,765,113
[45] Oct. 16, 1973

[54] RESILIENT CATTLE INDENTIFICATION TAG

[76] Inventor: Harry H. Magee, 1025 Lagonda Way, Danville, Calif. 94526

[22] Filed: Aug. 6, 1971

[21] Appl. No.: 169,714

[52] U.S. Cl. ............................................... 40/300
[51] Int. Cl. .......................................... G09f 03/04
[58] Field of Search ............................. 40/300–304

[56] References Cited
UNITED STATES PATENTS

| | | | |
|---|---|---|---|
| 150,996 | 5/1874 | Albright | 40/303 |
| 1,782,193 | 11/1930 | Callen | 40/303 |
| 2,086,493 | 7/1937 | Ellingwood | 63/3 |
| 2,243,736 | 5/1941 | Loblein | 156/220 |
| 3,334,434 | 8/1967 | Melin | 40/301 |
| 3,552,051 | 1/1971 | Ritchey | 40/301 |
| 3,021,630 | 2/1962 | Swett | 40/301 UX |

Primary Examiner—Robert W. Michell
Assistant Examiner—George M. Yahwak
Attorney—Townsend and Townsend

[57] ABSTRACT

A unitary livestock tag having at least two plys of a rubbery, flexible material and having two flaps of relatively equal dimensions joined by a narrow neck. The sides of the flap adjoining the neck angling backwards away from the neck and are mildly curved at the juncture. The flaps are slotted to aid a flap being pulled through slits formed in the hide of an animal.

8 Claims, 4 Drawing Figures

PATENTED OCT 16 1973 3,765,113
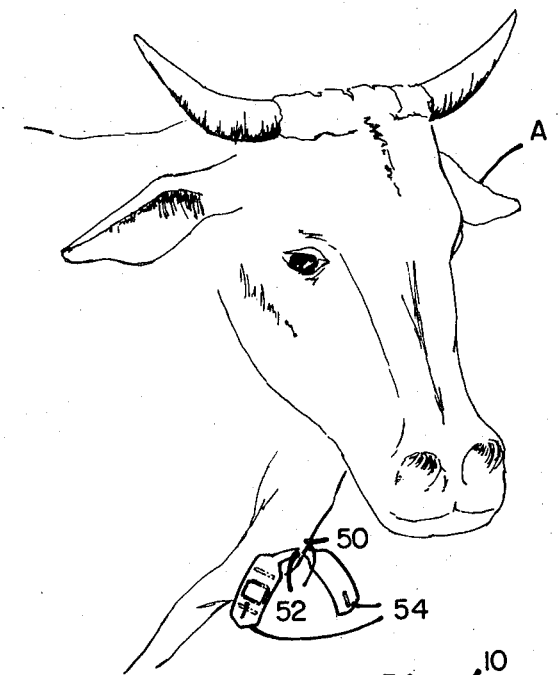
FIG_1
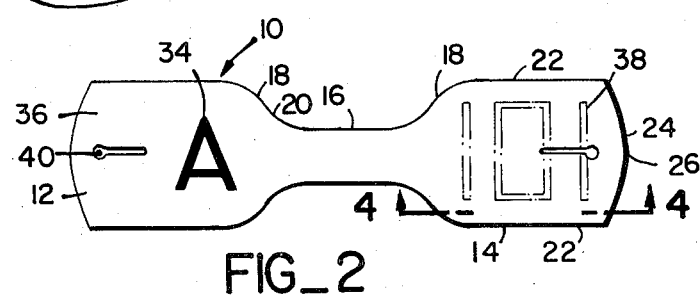
FIG_2
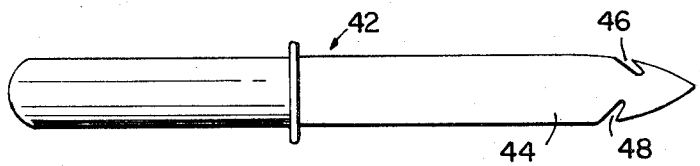
FIG_3
FIG_4
INVENTOR.
HARRY H. MAGEE
BY
Townsend and Townsend
ATTORNEYS

RESILIENT CATTLE INDENTIFICATION TAG

BACKGROUND OF THE INVENTION

1. Field of the Invention

Livestock marking tags are employed for identifying livestock, imparting information such as an animal's breeding, age, lot identification, or other information of use in evaluating livestock. For the most part, livestock tags have been introduced through the ear. Here tags have many disadvantages, in that they are frequently small, difficult to see from a distance, and obstructed by heavy coats of some livestock. Furthermore, after slaughter and the decapitation of the animal, the information is no longer associated with the hide.

It is therefore desirable to have a relatively large tag which would not interfere with the livestock's activities, and yet be readily visible upon approach to the livestock. Furthermore, the tag should not provide a site for catching onto barbed or thorn obstructions, which might be encountered in the field. This could result in skin irritation, tearing of the hide, and possible disease of the animal. Furthermore, a satisfactory tag should be easily and permanently marked, so as to be able to remain with the animal through the animal's life without replacement. To that extent, the tag must be durable and provide a wear-resistant surface for markings. In addition, desirably, the tag should not change its position, so as to rotate and obscure the markings on the tag.

A satisfactory tag should also be capable of being inserted in various parts of the animal. Desirable places for identification would include the side of the neck, right or left, top of the neck, brisket, tail and hock.

2. Description of the Prior Art

Various patents have issued describing a variety of different identification tags. These patents include U. S. Pat. Nos. 3,334,434, 3,468,050 and 3,552,051.

BRIEF DESCRIPTION OF THE DRAWINGS

FIG. 1 is a front perspective view of a steer, showing the tag of this invention affixed;

FIG. 2 is a plan view of the tag of this invention;

FIG. 3 is a plan view of a notched knife for use with the tag of this invention; and FIG. 4 is a section along the lines 4—4 in FIG. 2.

SUMMARY OF THE INVENTION

A flexible, livestock identification tag is provided comprising two flaps of substantially equal dimension joined by a narrow neck of relatively small dimension in comparison to the identification flaps and constructed of a core ply of fiber-reinforced synthetic rubber and at least one laminating ply of contrasting shade or color of the same or similar resilient material. The tag is constructed so as to have sloping sides, sloping away from the neck at the point of attachment to the neck, the point of attachment being somewhat rounded. The tag is of convenient dimensions to be passed through openings in the hide of the livestock by folding one of the flaps and has a slit which is fitted over a notch in a knife, which is used to cut the openings in the hides. The folded flap is drawn through the openings and then allowed to expand to its original dimension, locking the tag in the hide of the livestock.

DESCRIPTION OF SPECIFIC EMBODIMENTS

A livestock identification tag, which is particularly useful with bovines, is provided which has a narrow neck joining two identification flaps of substantially the same size. The flaps will be of about two to three times wider and longer than the neck, with the neck being from about ¾ inch to about 1½ inches in length and about ½ to 1¼ inches in width. Normally, the dimensions will be proportional, so as to provide a substantially rectangular neck, with the length being greater than the width.

The flaps will normally be irregularly shaped, having sides adjoining the neck sloping away from the neck at a moderate angle joining with two substantially parallel sides. The substantially parallel sides will normally be of about 1½ inches in length, more usually of about 1¾ to 2 and ¼ inches in length. The end opposite the neck may be flat, but preferably tapered to a point, about midway between the parallel sides. The total length will be at least about 6 inches, preferably at least about 7 inches and usually not more than about 8½ inches, more usually not more than about 7¾ inches.

The two flaps are substantially planar with the neck in the same plane or have the central axis of the neck slightly below the common plane of the flaps. The weight of the flaps and the resilience of the neck is such that the two flaps will hang loosely downwardly, approximately normal to the ground. Each flap will ordinarily have a slot about midway between the parallel sides and near the end opposite the neck. The slot is of a convenient dimension to be hooked and held firmly.

The construction of the tag is to have a unitary core which may be constructed from one to two plies of a resilient material. The core will be at least 25 mils in thickness, and not exceed about 80 mils in thickness, more usually being of about 40 to 70 mils in thickness. The core will be laminated with at least one ply of at least about 10 mils thickness of the same or similar resilient material. Normally, the laminating tag will be a contrasting shade or color, so that by gouging the laminate, one can introduce a permanent record into the tag. Alternatively, a second laminate of a contrasting shade or color may be coated onto the first laminate by gouging or rooting symbols through the colored outside ply to the contrasting inner ply will make the symbols stand out. Usually, both sides of the core will be laminated with from one to two laminations of a contrasting color. With two laminations on each side, one can use the three different colors for coding, so as to enhance the amount of information imparted.

The total thickness of the identification tag will normally be at least about 50 mils and not exceed about 110 mils, normally being in the range of about 70 to 100 mils.

The materials which find use are synthetic rubbers prepared from aliphatic, mono- and diolefins. These materials include chlorosulfonated polyethylene, ethylene-propylene terpolymer, and chloroprene. The synthetic rubbers should be abrasion resistant, weather resistant, should have a tensile strength of at least about 1,000 psi and preferably at least about 2,000 psi and a hardness, either Shore A or Durometer A of at least about 40.

The core can either be a single ply of resilient rubber reinforced with fiber or preferably two plys bonded together, conveniently by heat, with an internal fiber reinforcement. The reinforcement may be any convenient fiber material, particularly inorganic fibers, such as polyamides, e.g., nylon, or polyesters, e.g., Dacron. The contrasting color laminates can then be heat bonded to the core laminate so as to provide a composite structure, having a core and at least one contrasting colored laminate, more usually two contrasting colored laminates, each coating one side of the core and as many as a total of four contrasting colored laminates, two laminates on each side of the core.

The following compositions may be used to advantage in the construction of the identification tags of this invention. The preferred composition employs Hypalon 40 as a black core ply, employing two sheets of 30 mil thickness having nylon reinforcing scrim cloth with two white outer plys of Hypalon 40 or 30 mil thickness on opposite sides of the core. The various laminates are bonded together employing temperatures of about 300°–350°F. and pressures of from about 50–100 psi. Lettering, numbers or other symbols may be applied for coding, employing Hypalon 30, bonding flexible Hypalon to the outside ply using a heat seal, wherein the Hypalon is in the shape of a particular symbol, or routing out the top colored ply to uncover the black inner core.

An alternative to Hypalon is neoprene of the G series, particularly neoprene GNA or GRT. The formulation should employ titanium dioxide, rather than iron oxide. An exemplary formulation would be 100 parts of neoprene, 2 parts of an antioxidant 4 parts of magnesia, 0.5 parts of stearic acid, 70 parts of hard clay, 5 parts of titanium dioxide, 10 parts of process oil, 5 parts of zinc oxide and 0.5 parts of NA-22.

A third alternative is the use of ethylene-propylene terpolymers such as Nordel, supplied by DuPont de Nemours and Co., Wilmington, Del. Typical formulations may be found in brochures distributed by DuPont, Elastomer Chemicals Department, particularly numbers 367–111 and 667–301A.

The tag is conveniently attached to the animal by confining the animal, so as to restrain movement of the animal. The animal's hide is grasped and folded and a flat probe or knife, with at least one notch in the blade is employed for cutting the animal's hide to provide two holes approximately the distance of the length of the neck of the identification tag. One of the flaps may then be folded, the slit in the flap hooked into the notch and the flap pulled through the slits formed in the animal's hide.

Various means can be employed for passing the flap through the hide. The tapered construction of the flap simplifies the introduction of the flap into the hide and the passage of the flap through the hide and out the other slit. Besides the method described above, various mechanical devices can be employed for holding the flap in a convoluted shape, as the flap passes behind the hide and through the slits. See, for example, U. S. Pat. No. 3,552,051 and co-pending application Ser. No. 874,740, filed Nov. 7, 1969, now U.S. Pat. No. 3,675,357.

The tag is first conveniently coated with disinfectant, e.g., Lysol, prior to introduction through the slits in the hide of the animal. The Lysol not only provides protection from infection, but also provides lubricant for the easy passage of the flap through the slits. Any lubricating mild disinfectant may be employed, which is safe with animals.

The absence of sharp edges at the juncture of the flaps to the neck, aids in the healing of the hide, with the skin healing about the neck of the identification tag and preventing the rotation of the identification tag. This locks the identification tag in position, so that the same surface can be seen from the same angle at all times.

Turning now to consideration of the drawings, an identification tag 10 is provided having first and second flaps 12 and 14 respectively. The flaps are joined by neck 16, with the edges 18 of the flap sloping backward at an obtuse angle of about 120° to 160°, more usually about 130° to 150° at the point of juncture 20 of the edge and neck. The sloping edges 18 connect with horizontal edges 22, which extend for the major length of the flap. The end 24 opposite the neck preferably tapers to a point 26 approximately midway between the horizontal edges 22.

The flap normally has a core ply 28 and two laminating plys 30 and 32 on opposite sides of the core ply 28. A symbol 34 may be written on the surface 36 of the ply 30. Alternatively, symbols 38 may be employed by routing out portions of the laminating ply 30.

The flap has a longitudinal slit 40 to aid in drawing the tag through the slits in the livestock hide. When introducing the tag into the neck of a bovine A, for example, a knife 42 is used having substantially flat sides to the blade 44 and having notches 46 and 48 in the cutting edge on opposite sides of the blade and adjacent the pointed end of the knife. The knife is pushed through the loose skin 50 of the neck of the bovine, so as to form two slits 52. The slit 40 is then hooked over a notch 46, the flap 12 folded lengthwise and the knife 42 withdrawn, pulling the flap 12 through the slits 52 in the neck of the bovine. The flap then unfolds locking the tag in the neck of the bovine.

As is evident from the drawing, when the identification tag 10 is in the neck of the livestock, it hangs down much in angle from the neck and can be easily read from above, irrespective of the position of the livestock. That is, when the livestock is eating at a trough or has its head lowered, the tag is still readily viewed from the side. Because of the pliable construction of the tag, the tag is resilient like the skin of the livestock and does not tangle, being substantially an integral member bound to the hide. Furthermore, the tag does not irritate the skin and is held in a fixed position, once the skin is healed about the tag.

The tags employed in this invention are easily constructed and easily introduced through the animal's hide. They provide a wide area for imparting information and a number of different ways in which the information can be formed, as part of the tag or written on the surface of the tag. The tags are long-wearing, and abrasion-resistant, so they are capable of lasting for the life of the livestock. Therefore, a calf or lamb may be tagged, and the tag retained by the livestock for the life of the animal. Additional information may be easily recorded on the tag during the life of the animal.

The materials employed do not irritate the skin of the livestock, but rather become integrally bound as part of the hide so as to be held in a fixed position and rotation prevented. Furthermore, by introducing the tag into the neck of the livestock, the tag is readily visible from either side of the animal, irrespective of whether the head is raised or lowered.

The particular dimensions of the tag provide for ease of introduction of the tag through slits and the shape enhances the locking of the tag in the hide. The dimensions also provide ample room for identifying symbols of a convenient size to be read easily. The shape of the tag is such as to minimize the possibility of tangling or being caught by a barb or thorn which might result in injury to the animal.

The use of a notched knife to cut the slits in the animal and draw the tag back through, greatly enhances the efficiency of tagging an animal. Thus the time in which the animal need be restrained is greatly shortened.

These and other modifications of my invention may be practiced, it being understood that the form of my invention as described above is to be taken as a preferred example of the same. Such description has been by way of illustration and example for purposes of clarity and understanding. Changes and modifications may be made without departing from the spirit of my invention.

What is claimed is:

1. An identification tag for livestock of unitary construction of a resilient pliable material including at least one laminated ply and a core ply comprising two plys of synthetic fiber reinforced synthetic rubber having a total thickness of at least 35 mils, said resilient pliable material having two planar flaps extending from opposite ends of a neck, said neck of substantially smaller dimension than said flaps, wherein the weight of the flaps in relationship to the pliable nature of said material is sufficient to cause the flaps to extend in a downward direction when the neck is held parallel to the ground.

2. A tag according to claim 1, wherein the neck is flat and said tag comprises a core ply of from 25 to 80 mils and at least one lamination of from 10 to 30 mils.

3. A tag according to claim 1, wherein said resilient material is a synthetic rubber which is chlorosulfonated polyethylene, ethylene-propylene terpolymer or chloroprene.

4. A tag according to claim 1, wherein said flaps have sloping edges sloping away from the neck at the juncture of said neck and said flaps.

5. A tag according to claim 1 having a longitudinal slit adjacent the outer end of one of said flaps.

6. An identification tag for livestock of unitary construction of a resilient pliable material having two planar flaps extending from opposite ends of a flat neck, said neck of substantially smaller dimensions than said flaps, said tag being comprised of a core ply of synthetic fiber reinforced synthetic rubber and at least one laminated ply of a different color than said core ply and wherein the weight of the flaps in relationship to the pliable nature of said material is sufficient to cause the flaps to extend in a downward direction, when the neck is held substantially parallel to the ground.

7. A tag according to claim 6, wherein said laminated ply is grooved so as to reveal a portion of said core ply.

8. A tag according to claim 6, wherein said resilient material is a synthetic rubber which is chlorosulfonated polyethylene, ethylene-propylene terpolymer or chloroprene.

* * * * *